United States Patent [19]

Eising

[11] Patent Number: 4,627,460

[45] Date of Patent: Dec. 9, 1986

[54] CONDENSATE DISCHARGE DEVICE FOR COMBUSTION APPARATUS

[75] Inventor: John P. Eising, Oconomowoc, Wis.

[73] Assignee: A. D. Smith Corporation, Milwaukee, Wis.

[21] Appl. No.: 798,793

[22] Filed: Nov. 15, 1985

Related U.S. Application Data

[63] Continuation-in-part of Ser. No. 616,608, Jun. 4, 1984, abandoned.

[51] Int. Cl.⁴ ............................................. F16T 1/20
[52] U.S. Cl. ................................. 137/192; 137/409; 137/314
[58] Field of Search .................. 126/381, 382, 19.5; 431/29; 165/119; 251/54, 119, 120, 319; 137/192, 247.23, 247.21, 433, 314, 397, 409, 533.11, 546

[56] References Cited

U.S. PATENT DOCUMENTS

| | | |
|---|---|---|
| 611,040 | 9/1898 | Mather . |
| 915,780 | 3/1909 | Malcolm . |
| 944,811 | 12/1909 | Nageborn . |
| 1,658,424 | 2/1928 | Yerkes et al. . |
| 2,746,476 | 5/1956 | Dopkeen ............... 137/204 |
| 3,071,148 | 1/1963 | Woodmansee ......... 137/193 |
| 3,209,738 | 10/1965 | Powers .................. 123/119 |
| 3,223,118 | 12/1965 | Hutelmyer ............. 137/572 |
| 3,454,005 | 7/1969 | Eubanks et al. ........ 128/186 |
| 3,485,260 | 12/1969 | Hendrickson .......... 137/204 |
| 3,530,876 | 9/1970 | Stoner ................... 137/399 |
| 3,610,275 | 10/1971 | Determan ............... 137/430 |
| 3,799,186 | 3/1974 | Bolin .................... 137/204 |
| 3,827,343 | 8/1974 | Darm .................... 98/115 |
| 4,241,874 | 12/1980 | Schossow ............... 237/55 |
| 4,275,705 | 6/1981 | Schaus .................. 126/110 |

FOREIGN PATENT DOCUMENTS

| | | |
|---|---|---|
| 0062014 | 6/1982 | European Pat. Off. . |
| 0102141 | 7/1984 | European Pat. Off. . |
| 381252 | 10/1932 | United Kingdom . |
| 780196 | 7/1957 | United Kingdom . |
| 1357953 | 6/1974 | United Kingdom . |
| 2000274 | 1/1982 | United Kingdom . |

Primary Examiner—Carroll B. Dority, Jr.
Attorney, Agent, or Firm—Andrus, Sceales, Starke & Sawall

[57] ABSTRACT

A condensate discharge device for combustion apparatus which automatically drains condensate from the combustion chamber or flue while preventing escape of gaseous products of combustion. The device includes a housing having an inlet in its upper end connected to the combustion conduit containing the waste gases of combustion. An outlet tube is disposed in an opening in the lower end of the housing in alignment with the inlet and the upper end of the outlet tube projects a substantial distance above the lower surface of the housing and provides a seat. A hollow plastic ball rests on the seat to prevent escape of gases from the housing. Condensate generated by cooling of the combustion gases flows into the housing and when the condensate accumulates to a level above the seat, the ball will float to permit the discharge of the condensate while preventing discharge of the gaseous products of combustion. A generally vertical vent tube communicates with the outlet tube and has an open upper end positioned beneath the conduit. If an obstruction occurred in the outlet tube, condensate will overflow through the vent tube to permit condensate from accumulating in the conduit.

6 Claims, 4 Drawing Figures

CONDENSATE DISCHARGE DEVICE FOR COMBUSTION APPARATUS

This application is a continuation-in-part of application Ser. No. 06/616,608, filed June 4, 1984, now abandoned, and entitled "Condensate Discharge Device For Combustion Apparatus".

BACKGROUND OF THE INVENTION

In high energy efficient water heaters and furnaces, waste gases of combustion are passed in heat transfer relation with water or air to extract heat from the combustion gases. Cooling of the combustion gases through heat transfer results in the production of substantial quantities of condensate and it is necessary to discharge the condensate without allowing escape of the combustion gases into the surrounding building.

In the past, various types of condensate discharge devices have been employed in steam or compressed air systems to permit the discharge of condensate while preventing escape of the gas. One form of condensate discharge device, as used in the past has been a P-trap. While devices of this type are effective to discharge condensate without permitting the gas to enter the environment, foreign materials or contaminants tend to collect in the trap and eventually clog the line and prevent operation.

Other types of condensate discharge devices are complicated structures requiring numerous moving parts which can be subject to corrosion by contaminates in the waste gas.

SUMMARY OF THE INVENTION

The invention is directed to an improved condensate discharge device for a combustion apparatus which automatically drains condensate from the combustion system, while preventing escape of gaseous products of combustion into the environment.

In accordance with the invention, the device includes a housing having an inlet in its upper end which is connected to the lower end of the combustion system or conduit. An outlet tube is mounted within an opening in the lower end of the housing in alignment with the inlet, and the upper end of the tube projects upwardly from the lower surface of the housing to provide a seat. Mounted on the seat is a hollow plastic ball which prevents discharge of gas through the outlet.

Condensate generated by cooling of the combustion gases in the combustion system will flow through the inlet into the housing and when the condensate accumulates to a level above the seat, the ball will float to permit the discharge of the condensate.

The condensate discharge device or trap of the invention is of simple and inexpensive construction having only a single moving part, which is the float ball, and no adjustment is required for its operation.

The housing, outlet tube and ball are preferably formed of plastic material so that the entire unit is non-corrosive.

The space between the upper end of the outlet tube and the lower end of the housing defines a sump wherein contaminates are collected, thereby preventing the contaminates from accumulating on the valve seat and insuring proper sealing of the ball valve to the seat.

Due to the design of the unit, the ball is self-centering, and after discharge of the accumulated condensate, the ball will automatically reseat itself on the upper end of the outlet tube.

In certain installations, the outlet tube of the condensate discharge device may be connected through a flexible hose to a drain or sewer line. If the discharge hose should become clogged or crimped, preventing the condensate from being discharged from the drain, the condensate may back-up into the conduit containing the waste gases of combustion causing the usual pressure switch in the conduit to shut off operation of the furnace. As a feature of the invention, the condensate discharge device includes a generally vertical vent tube which is connected to the outlet tube of the device. The upper end of the vent tube is located at a level beneath the conduit containing the waste gases. If the condensation should backup in the outlet tube, the condensate will drain through the vent tube, preventing shut down of the furnace. Condensate draining from the vent tube will also provide a visual indication of the clogged condition and provide advance warning of potential problems in time to take corrective action.

The vent tube also eliminates air pockets which might prevent an otherwise satisfactory operation of the device. Occasionally a pocket of air in the drain line may prevent drainage of condensate.

As an additional advantage, the vent tube serves as a vacuum break. If the outlet end of the drain conduit or hose is at a level of several feet beneath the level of the condensate trap, and if the drain conduit is substantially filled with condensate, the ball would be held against the seat by a negative pressure differential making it impossible for the ball to unseat and float so that condensate would not be released but would accumulate in and above the trap.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
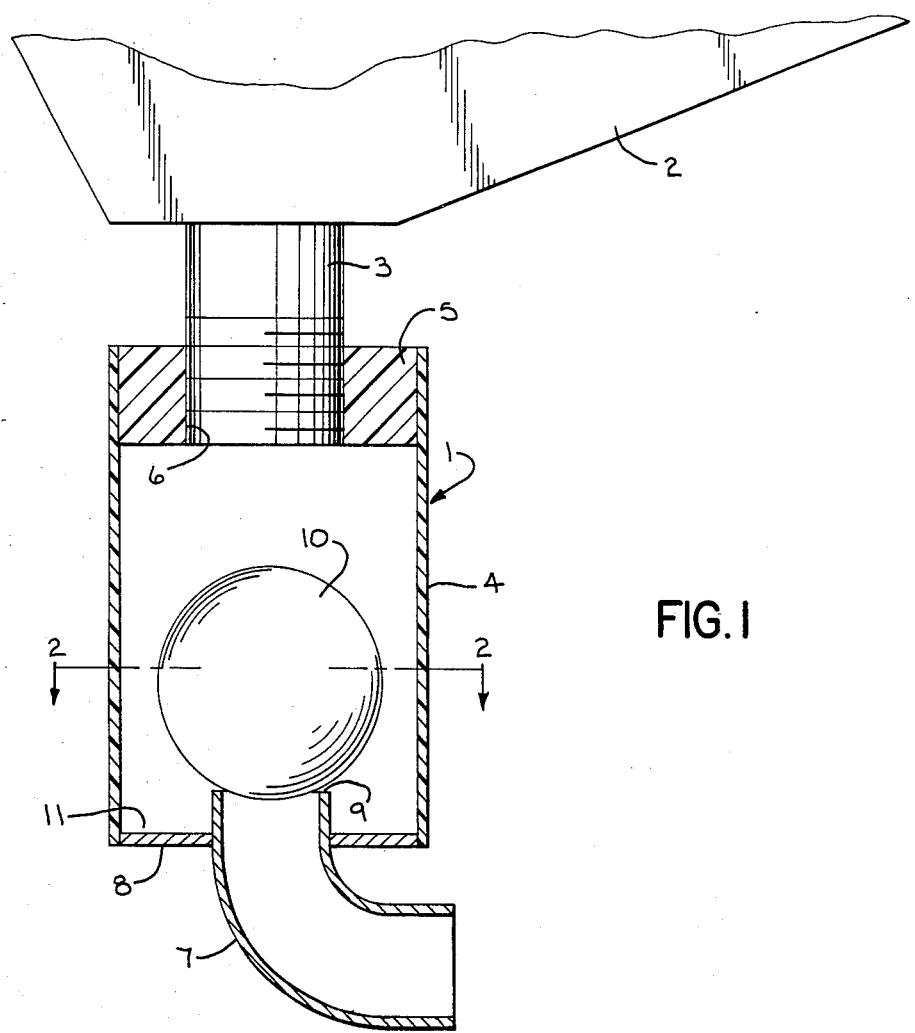
FIG. 1 is a vertical section of the condensate discharge device of the invention as associated with a combustion system.
Figure 2:
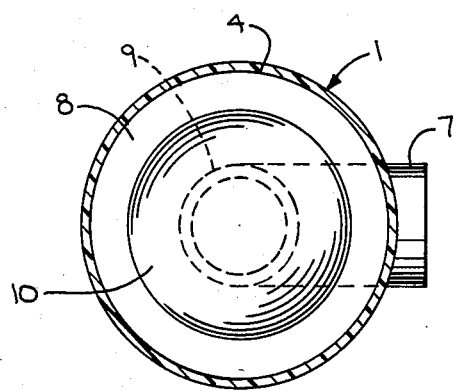
FIG. 2 is a line taken along line 2—2 of FIG. 1.

FIGS. 1 and 2 illustrate a condensate discharge device 1 which is connected to a conduit 2 containing waste gases of combustion. The conduit 2 can take the form of a combustion chamber, heat exchanger, flue or the like, through which the waste gases of combustion are passed to the atmosphere.

A nipple 3 connects the lower end of the conduit 2 to the device 1 and condensate generated by cooling of the waste gases in conduit 2 will flow through nipple 3 into the device 1.

The discharge device 1 includes a cup-shaped housing 4 having an open end which is enclosed by a plug 5 which is bonded to the open end of the housing by an adhesive or the like. Plug 5 is provided with a threaded opening 6 which receives the lower end of nipple 3.

Mounted within an opening in the lower end of housing 4 is a generally L-shaped outlet tube 7. The inner end of tube 7 projects a substantial distance above the lower surface 8 of housing 4 and defines a seat 9. A spherical float 10 normally rests on seat 9 and prevents the discharge of gases from housing 1 to the exterior. Ball 10 is hollow and is preferably formed of plastic material, having a specific gravity less than 1.0, so that as condensate accumulates within the housing 4, the ball will float on the condensate to open the seat 9 and permit the condensate to drain through the outlet tube. In practice, the ball is provided with a specific gravity so that it will float to open the valve seat when the condensate has accumulated to a level about ¼ inch above the seat 9.

The space between seat 9 and the lower end 8 of housing 4 defines a reservoir or sump 11 and contaminates in the condensate will be collected in sump 11 and thus will not accumulate on the seat 9 to disrupt proper seating of the ball on the seat.

All of the components of the discharge device, including the housing 4, outlet tube 7, ball 10 and plug 5 are preferably formed of plastic material so that the entire unit is non-corrosive. The device is of simple and inexpensive construction, being gravity actuated, and includes only one moving part which is the spherical float or ball. Furthermore, the device is operable without adjustment.

The hollow plastic ball being light in weight provides improved response to accumulated condensate.

The in-line construction of the inlet and outlet facilitates plastic molding and the incoming condensate entering the housing through nipple 3 tends to flush and rotate the ball, thereby cleaning the ball and removing contamination to insure proper seating of the ball on the seat 9. As a further advantage, the incoming condensate is deflected outwardly by the ball and is directed toward the sump 11, thereby providing some agitation of the condensate in the sump. Agitation of the condensate results in some of the contaminants in the sump being suspended in the liquid and carried out through the outlet tube.

Figure 3:
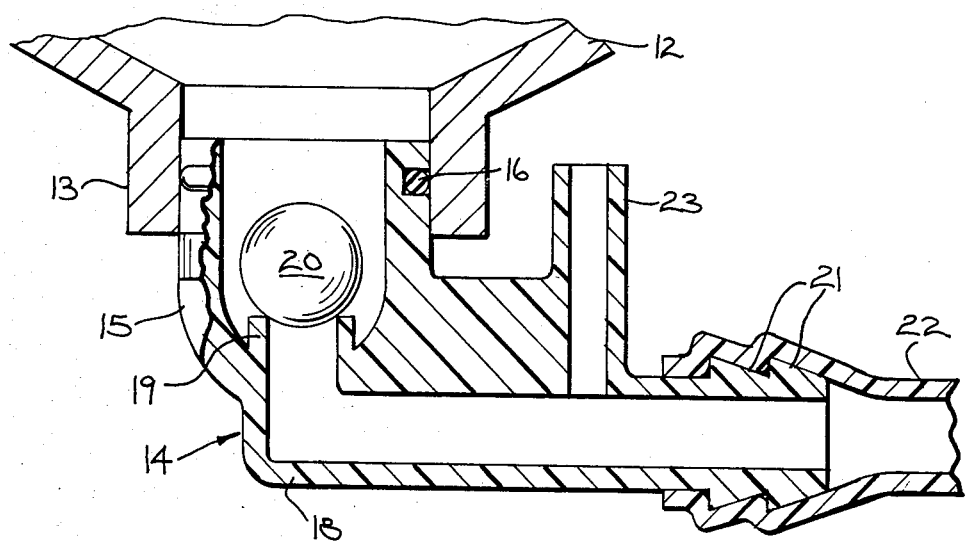
FIG. 3 is a side elevation with parts broken away in section of a modified form of the condensate discharge device.
Figure 4:
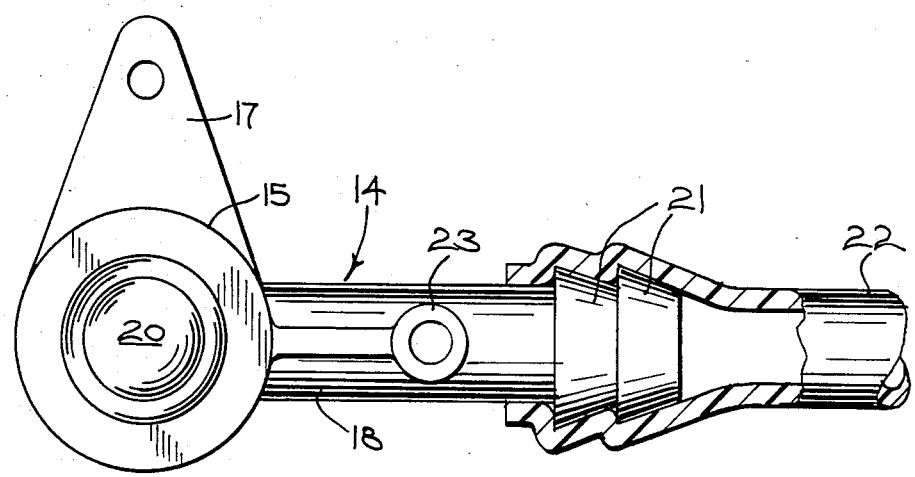
FIG. 4 is a top plan view of the device of FIG. 3 unassembled with the combustion system.

FIGS. 3 and 4 illustrate a modified form of the invention. As illustrated in FIG. 3, conduit 12 is adapted to conduct waste gases of combustion and may take the form of a combustion chamber, heat exchanger, flue, or the like. The lower portion of conduit 12 is provided with a flanged opening 13 and the condensation discharge device or trap 14 of the invention is mounted within the flanged opening 13.

The condensation discharge device 14 includes a body or housing 15, preferably molded from plastic material, and the outer surface of body 15 is provided with a circumferential groove which receives an O-ring 16, to provide a seal to flange 13 of conduit 12. A bracket 17 extends laterally from body 15 and can be connected to a boss on the conduit 12 through a screw or other fastener to secure the condensation discharge device to the conduit.

As in the first embodiment, an outlet tube 18 extends upwardly through an opening in the bottom of body 15 and the inner end of tube 18 defines a seat 19. A spherical float 20, similar to float 10, normally rests on seat 19 and prevents the discharge of gases from the conduit 12 to the exterior. As condensate accumulates within the body 15, ball 20 will float to open the seat 19 and permit the condensate to drain through the outlet tube.

As shown in FIG. 3, the outer end of outlet tube 18 is provided with a pair of barbs 21 which are received within an end of a flexible discharge hose 22. Discharge hose 22 communicates with a drain or sewer line so that the condensate flowing through tube 18 will be automatically drained to the drainage system.

In accordance with the feature of the invention, a vent tube 23 communicates with outlet tube 17, and the upper open end of vent tube 23 is located approximately at the level of the upper end of body 15 and beneath the lower portion of conduit 12.

In the event hose 22 should become clogged or crimped to prevent the discharge of condensate, the condensate will back-up in outlet tube 18 and body 15 and will overflow from vent tube 23, preventing the condensate from backing-up into the waste gas conduit 12. An accumulation of condensate in conduit 12 can cause the conventional pressure switch of the furnace to be actuated to shut off the furnace, and venting of the condensate through tube 12 will prevent this problem.

Furthermore, the overflow of condensate from vent tube 12 provides a visual indication of the clogging of the discharge hose 22.

Various modes of carrying out the invention are contemplated as being within the scope of the following claims particularly pointing out and distinctly claiming the subject matter which is regarded as the invention.

I claim:

1. A condensate discharge device for a combustion appartus, comprising a housing having an inlet connected to a conduit containing waste gases of combustion and having an opening in the lower end, an outlet tube havihg one end disposed within the opening and defining a seat, a spherical float disposed within the housing and disposed to engage the seat to prevent flow through said outlet tube, condensate generated by cooling of said combustion gases flowing from said conduit into said housing and an accumulation of condensate above the level of said seat causing the float to lift from the seat to permit the discharge of condensate while preventing discharge of gas through said outlet tube, and a vent tube connected to said outlet tube and extending upwardly therefrom, an accumulation of condensate in said outlet tube being discharged through said vent tube to prevent said condensate from backing-up into said conduit.

2. The device of claim 1, and including a flexible hose connected to the outer end of said outlet tube and connecting said tube with a drain area.

3. The apparatus of claim 1, wherein the upper end of said vent tube is at a level beneath the lower portion of said conduit whereby an accumulation of condensate will vent through said vent tube before accumulating in said conduit.

4. In combination, a conduit to conduct waste gases of combustion and having an opening in a lower portion thereof, cooling of said waste gases generating condensate, a condensation discharge device connected to said opening for collecting and discharging said condensate, said device including a housing communicating with said opening, an outlet tube having an inner end portion disposed within the housing with the inner end of said outlet tube defining a seat and having an outer end portion disposed on the exterior of said housing, a spherical float disposed within the housing and arranged to engage the seat to prevent flow through said outlet tube, an accumulation of condensate above the level of said seat causing said float to lift from said seat to permit discharge of the condensate through said outlet tube while preventing discharge of gas through said outlet tube, and a vent tube extending upwardly from the outer portion of said outlet tube and having an upper end communicating with the atmosphere, a back-up of condensate in said outlet tube overflowing through said vent tube to prevent said condensate from accumulating in said conduit.

5. The device of claim 4, wherein said inner portion of said outlet tube constitutes a vertical leg and said outer portion of said outlet tube constitutes a generally horizontal leg, said vent tube extending vertically from said horizontal leg.

6. The apparatus of claim 5, and including a flexible hose connected to the horizontal leg of said outlet tube to drain condensate to a drain area.

* * * * *

UNITED STATES PATENT AND TRADEMARK OFFICE
CERTIFICATE OF CORRECTION

PATENT NO. : 4,627,460
DATED : December 9, 1986
INVENTOR(S) : JOHN P. EISING

It is certified that error appears in the above-identified patent and that said Letters Patent is hereby corrected as shown below:

Front Page at "[73[ Assignee:" Cancel "A. D. SMITH CORPORATION" and substitute therefor ---A. O. SMITH CORPORATION---

Signed and Sealed this

Twenty-fifth Day of August, 1987

Attest:

DONALD J. QUIGG

Attesting Officer  Commissioner of Patents and Trademarks